United States Patent
Miller et al.

(10) Patent No.: US 7,440,529 B2
(45) Date of Patent: *Oct. 21, 2008

(54) METHOD FOR SYNCHRONIZATION OF WIRELESS DEVICES THROUGH ACCELERATED ADVANCE OF COUNTERS

(75) Inventors: Kevin Miller, Lawrenceville, GA (US); Anders Hebsgaard, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/826,430

(22) Filed: Jul. 16, 2007

(65) Prior Publication Data

US 2008/0013661 A1 Jan. 17, 2008

Related U.S. Application Data

(63) Continuation of application No. 10/638,293, filed on Aug. 12, 2003, now Pat. No. 7,260,165.

(60) Provisional application No. 60/429,308, filed on Nov. 27, 2002.

(51) Int. Cl.
*H04L 7/00* (2006.01)

(52) U.S. Cl. ..................................... 375/354

(58) Field of Classification Search ................ 375/219, 375/220, 222, 354, 355, 356; 370/464, 498, 370/503, 345, 330, 352, 432, 493, 324, 480

See application file for complete search history.

(56) References Cited

U.S. PATENT DOCUMENTS

| 6,058,453 | A | 5/2000 | Packer |
| 7,050,419 | B2 | 5/2006 | Azenkot et al. |
| 7,099,293 | B2 | 8/2006 | Cervini |
| 7,260,165 | B2 * | 8/2007 | Miller et al. ................ 375/354 |

* cited by examiner

*Primary Examiner*—Sam K Ahn
(74) *Attorney, Agent, or Firm*—Sterne Kessler Goldstein & Fox, p.l.l.c.

(57) ABSTRACT

A method for synchronizing counters in a wireless terminal device with those of an administrative device. With each increment of the frame counter in a wireless terminal device, the wireless device minislot counter advances by an amount equal to the number of minislots per frame. Likewise, with each increment of the frame counter, the wireless device's timestamp counter is incremented by the number of timestamps per frame. This continues until the counters at the wireless device are within one frame of the administrative device's counters. The minislot counter is then incremented. With each increment of the minislot counter, the timestamp counter is incremented by an amount equal to the number of timestamps per minislot. This continues until the wireless devices counters are within a minislot of the administrative device's counters. The timestamp counter is then incremented until the wireless device's counters match those of the administrative device.

4 Claims, 2 Drawing Sheets

METHOD FOR SYNCHRONIZATION OF WIRELESS DEVICES THROUGH ACCELERATED ADVANCE OF COUNTERS

CROSS-REFERENCE TO RELATED APPLICATIONS

The present application claims benefit to and is a continuation of U.S. patent application Ser. No. 10/638,293, filed Aug. 12, 2003, entitled "Method for Synchronization Through Accelerated Advance of Counters," by Miller et al., ('293 Application), which is hereby incorporated by reference in its entirety and issued as U.S. Pat. No. 7,260,165.

The '293 Application in turn claims benefit to provisional application U.S. Patent Ser. No. 60/429,308, filed Nov. 27, 2002, entitled "Method for Synchronization Through Accelerated Advance of Counters," by Miller et al., which is also incorporated by reference in its entirety herein.

BACKGROUND OF THE INVENTION

1. Field of the Invention

The invention described herein relates to communications systems, and in particular to synchronization.

2. Related Art

In recent years distributed computing and communications systems that rely on or provide high speed data communications have become ubiquitous. Such systems may include, but are not limited to, broadband communication systems using cable modems, satellite communication systems, fiber to the home (FTTH) communications networks, and board-to-board interconnections in a myriad of electronic devices.

In many of these applications, the operation of remotely distributed devices must be synchronized for efficient operation. There are many reasons why remotely distributed devices may need to be synchronized. Two of the more common reasons relate to the efficient functioning of the devices. In particular, in a digital communication system a receiving device must be properly synchronized to a sending device to enable the efficient processing and interpretation of an incoming data stream. If the devices are not properly synchronized, the receiving device may not be able to properly receive or interpret data being transmitted to it. Additionally, time division multiplexing and/or synchronous code division multiplexing can be used to allocate bandwidth to remotely distributed terminal devices for signal transmission to a single master or administrative device (i.e., transmission in the so-called "upstream" direction). Here, the remotely distributed devices must be synchronized. If the terminal devices are not synchronized with the administrative device, an undesirable situation may arise. The terminal devices may transmit data at the same time or at the wrong time. This can lead to confusion and loss of data at the administrative device.

Moreover, synchronization must happen quickly. Any delay in achieving synchronization represents lost time, during which communication is unavailable. Such delay diminishes the quality of service and can impact revenue for the service provider.

In the case of communications systems that implement a version of the Data Over Cable System Interface Specification (DOCSIS), a terminal device, such as a cable modem, must have the same notion of the current position in the upstream as an associated administrative device (or cable modem termination system (CMTS), also known as a "headend"). In such systems, the headend specifies an interval in time and/or in the spreading spectrum in which a given terminal device can transmit to the headend. If the transmission takes place at some other point, interference can occur with respect to another transmission, and data will be lost. Moreover, if transmission takes place at an incorrect point, the headend may not be prepared to receive the transmitted data. Hence the headend and its associated cable modems must be synchronized. Only after synchronization is achieved can a cable modem transmit at the point specified by the headend.

Note that the problem of achieving synchronization is not limited to cable systems, or to DOCSIS-based systems. The problem is independent of any particular medium or protocol. The problem arises in any communications system in which communicating entities must have a common sense of time, for example. In any communications system that uses time division multiplexing, for instance, transmitters and receivers must know when data is to be sent and must therefore have a common notion of time. This requires synchronization.

In some systems, the problem is addressed by the transmission of one or more counter values from an administrative device to a terminal device. In a DOCSIS 2.0 system, for example, the headend maintains a set of three counters that track the upstream bandwidth. The first counts frames in the upstream. The second counter counts minislots. There is an integer number of minislots per frame. The third counter counts timestamps. There is an integer number of timestamps per minislot (and therefore an integer number of timestamps per frame).

At the headend, the timestamp counter increments at a fixed frequency. Once the timestamp counter has incremented by the number of timestamps per minislot, the minislot counter increments by one. Once the minislot counter has incremented by the number of minislots per frame, the frame counter increments by one. For example, if there are ten timestamps per minislot, the timestamp and minislot counters, during some interval, might increment as follows:

TABLE 1

| | Minislot | | |
|---|---|---|---|
| | 20 | 21 | 22 |
| Timestamp | 100, 101, ... 109 | 110, 111, ... 119 | 120, 121, ... 129 |

The minislot counter increments only at every tenth timestamp. When the time stamp counter reaches 110, for example, the minislot counter increments. Timestamps 110, 120, etc. therefore represent minislot boundaries, i.e., points in the timestamp sequence at which the minislot counter increments.

An analogous relationship exists between the minislot and frame counters. If there are ten minislots per frame, for example, the minislot and frame counters might increment as follows during some interval:

TABLE 2

| | Frame | | |
|---|---|---|---|
| | 10 | 11 | 12 |
| Minislot | 20, 21, ... 29 | 30, 31, ... 39 | 40, 41, ... 19 |

The frame counter increments only at every tenth minislot. When the minislot counter reaches 29, for example, the frame counter increments. Minislots 20, 30, 40, etc. therefore represent frame boundaries, i.e., points in the minislot sequence at which the frame counter increments.

In order to synchronize one or more associated cable modems, the set of frame, minislot, and timestamp counter values is sent by the headend to each cable modem. The set of counter values, known collectively hereinafter as a snapshot, represents a point in the upstream as administered at the headend. The cable modem must then read these received counter values into its own counters, and adjust them so that they match the present counter values of the headend. This is because the counter values at the headend have continued to increment since initial transmission of the snapshot. One method by which the cable modem could adjust its counters is to use a faster clock to increment them. While this would eventually allow the cable modem's counters to catch up to the headend's counters, the process is slow. The relative acceleration of the cable modem's counters is only the ratio of the accelerated clock frequency to the normal clock frequency. As a result, significant time is lost during such a process, time during which communications cannot take place. Moreover, this problem may exist in any communications system where a terminal device's counters must catch up to those of an administrative device.

Hence there is a need for a method by which an administrative device and a terminal device in a data communications system achieve synchronization in a timely manner, such that counters at a terminal device are quickly advanced to a desired state, i.e, a state that matches that of an administrative device.

SUMMARY OF THE INVENTION

The invention described herein addresses the problem of rapid synchronization between communicating entities and a data network. In particular, given a network that features an administrative device associated with one or more terminal devices, all the devices may need to have a common sense of position in the upstream. This is particularly true of communications systems that rely on time division multiplexing and/or synchronous-code division multiplexing. In such systems, communications can only take place at designated intervals.

In some of these communications systems, the administrative device sends one or more values to its associated terminal devices, where the values represent position in the upstream. These values are then received by the terminal devices. The terminal devices must then advance their logic to match that of the administrative device. This allows the terminal devices to have the same sense of position in the upstream.

In some communications systems, the transmitted values comprise a set of counter values, or a snapshot. As described above, while the counter values of the snapshot collectively represent a specific point in the upstream, each individual counter value represents bandwidth as measured in a particular unit, wherein the units tracked by the counters are hierarchical. For example, in DOCSIS-based communications systems, one counter represents a timestamp. Another counter represents a minislot count, such that a minislot is composed of a fixed integer number of timestamps. Therefore, while the timestamp counter increments with each new timestamp, the minislot counter increments only after this fixed number of timestamps elapse. Similarly, a third counter represents the frame count. A frame is composed of a fixed integer number of minislots. Hence, the frame counter increments only after this number of minislots have elapsed.

In the context of a DOCSIS system, therefore, the snapshot as sent from the administrative terminal (i.e., the cable modem termination system, or headend) consists of a frame counter value, a minislot counter value, and a timestamp counter value. When the snapshot is received at a terminal device (i.e., a cable modem), the terminal device must advance its three counters (i.e., frame counter, minislot counter, and timestamp counter) starting from the received snapshot, so as to match the headend's sense of upstream position. Advancing the counters is necessary because the headend's counters have continued to step during the transmission of the snapshot and during the processing at the cable modem.

In the invention described herein, a terminal device advances its first counter, that which corresponds to the largest block of bandwidth, e.g., the frame counter in a DOCSIS system. With each increment of the frame counter, the minislot counter advances by an amount equal to the number of minislots per frame. Likewise, with each increment of the frame counter, the timestamp counter is incremented by the number of timestamps per frame. This continues until the counters at the terminal device are within one frame of the headend's counters.

Next, the minislot counter is incremented while the frame counter is held constant. When the minislot counter is incremented, the timestamp counter is incremented by the number of timestamps per minislot. The frame counter is then incremented only if the minislot counter has advanced to a point corresponding to the boundary of a frame. This process continues until the counters at the terminal device are within one minislot of the headend's counters.

The timestamp counter is then incremented. If a minislot boundary is reached, then the minislot counter is incremented. Likewise, if a frame boundary is reached, the frame counter is incremented. Incrementing the timestamp counter continues until the desired counter setting is reached.

Further embodiments, features, and advantages of the present invention, as well as the structure and operation of the various embodiments of the present invention, are described below with reference to the accompanying drawings.

BRIEF DESCRIPTION OF THE DRAWINGS/FIGURES

DETAILED DESCRIPTION OF THE INVENTION

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

In the invention described herein, a terminal device, such as a cable modem, advances its first counter, that which corresponds to the largest block of bandwidth. This counter corresponds to the frame counter in a DOCSIS system. With each increment of the frame counter, the minislot counter advances by an amount equal to the number of minislots per frame. Likewise, with each increment of the frame counter, the timestamp counter is incremented by the number of timestamps per frame. This continues until the counters at the cable modem are within one frame of the headend's counters.

Next, the minislot counter is incremented while the frame counter is held constant. When the minislot counter is incremented, the timestamp counter is incremented by the number of timestamps per minislot. The frame counter is then incremented only if the minislot counter has advanced to a point corresponding to the boundary of a frame. This process continues until the counters at the cable modem are within one minislot of the headend's counters.

The timestamp counter is then incremented. If a minislot boundary is reached, then the minislot counter is incremented. Likewise, if a frame boundary is reached, the frame counter is incremented. Incrementing the timestamp counter continues until the desired setting is reached.

II. Method

Figure 1:
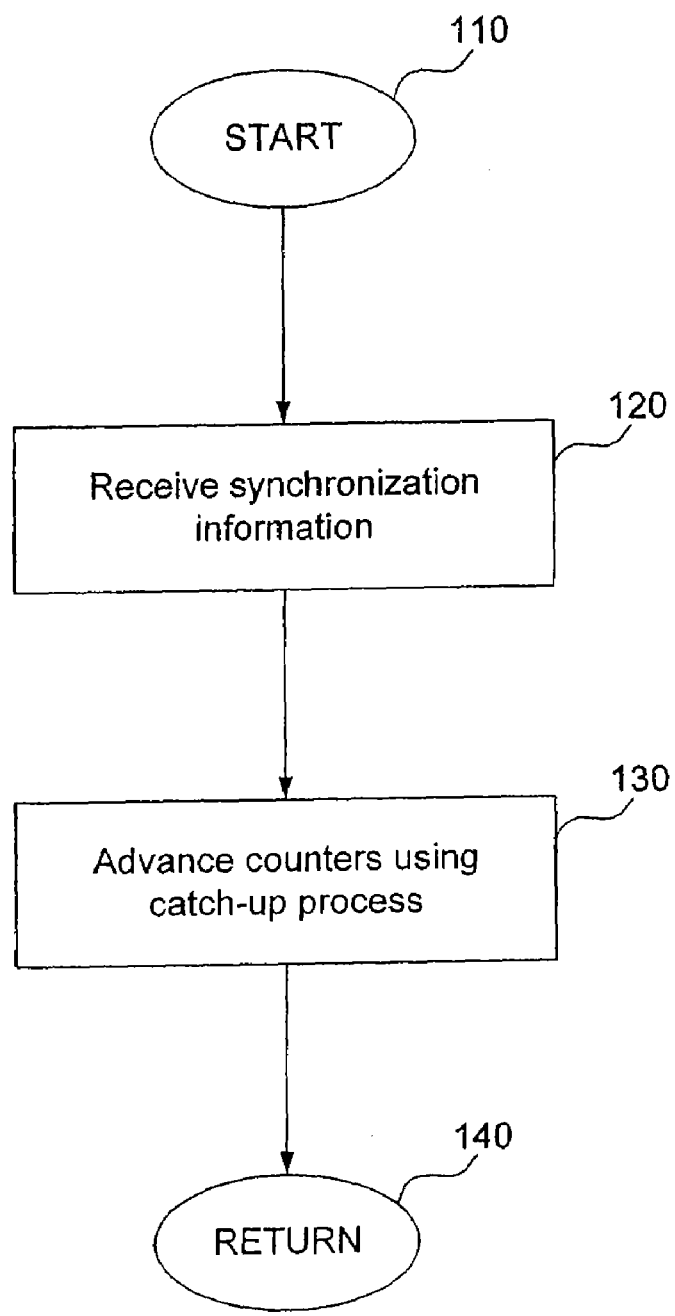
FIG. 1 is a flowchart illustrating generally the processing at a terminal device wherein the counters at the terminal device are advanced to match the counters at an administrative device, according to an embodiment of the invention.

The method of the invention is illustrated generally in FIG. 1. The method begins with step 110. In step 120, a terminal device, such as a cable modem in a DOCSIS-based system, receives synchronization information from an administrative device, such as a headend. In an embodiment of the invention, the synchronization information comprises a set of counter values (i.e., a snapshot) that represent a position in the upstream as administered by the administrative device. In step 130, the terminal device advances its counters using a catch-up process (described in greater detail below). This allows a terminal device to adjust its counters to match those of the administrative device. The process concludes at step 140.

Figure 2:
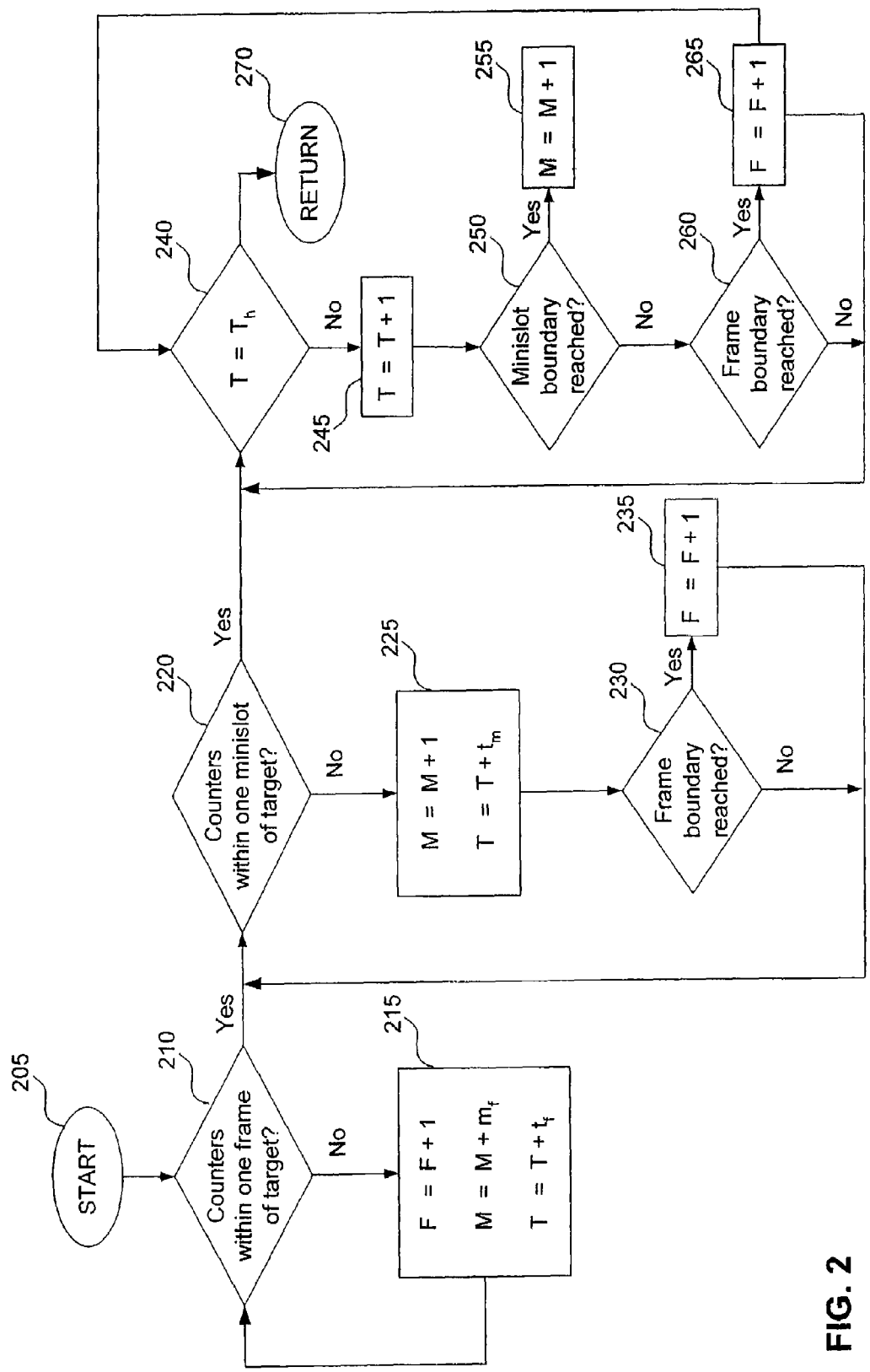
FIG. 2 is a flowchart illustrating in greater detail the processing at a terminal device, performed to advance the counters at the terminal device, according to an embodiment of the invention.

Step 130, the step of advancing counters in the terminal device, is illustrated in greater detail with respect to a DOCSIS-based system in FIG. 2. The process begins with step 205. In step 210, a determination is made as to whether the counters in the cable modem are within one frame of a target value, wherein the target value represents the counter values of the headend. If not, the process continues at step 215. Here, the first counter F (the frame counter in a DOCSIS-based system) is incremented by one. A second counter, the minislot counter M in a DOCSIS-based system, is incremented by an amount equal to the number of minislots in a frame. This increment is denoted $m_f$. A third counter, the timestamp counter T in a DOCSIS-based system, is incremented by a value equal to the number of timestamps per frame. The amount of this increment is denoted $t_f$. This step of incrementing the frame counter and incrementing the minislot and timestamp counters by corresponding amounts is referred to herein as synchronously incrementing the counters. The process then returns to step 210. This loop continues until the counters in the cable modem are within one frame of the headend's current counter values.

If the counters in the cable modem are within one frame of the target value, then the process continues at step 220. Here, a determination is made as to whether the counters are within one minislot of the target value. If not, the process continues at step 225. Here, the minislot counter M is incremented by one. In addition, the timestamp counter T is synchronously incremented by value $t_m$, equal to the number of timestamps per minislots. The process then continues to step 230. Because a fixed number of minislots corresponds to a frame, repeatedly incrementing the minislot counter may result in a need for the frame counter to increment, or "turn over" when enough minislots elapse. This point in the minislot sequence is a frame boundary. Hence, in step 230, a determination is made as to whether a frame boundary has been reached. If so, then the frame counter F is incremented by one in step 235. The process then returns to step 220. This loop continues until the counters in the cable modem are within one minislot of the target value.

Once this is true, then the process continues at step 240. Here, a determination is made as to whether the timestamp counter T is equal to the timestamp value of the headend, $T_h$. If not, the process continues at step 245, where the timestamp counter T at the cable modem is incremented by one. The process then continues to step 250. Because a fixed number of timestamps corresponds to a minislot, repeatedly incrementing the timestamp counter T may result in a need for the minislot counter M to increment when enough timestamps elapse. This point in the timestamp sequence is referred to as a minislot boundary. Hence, in step 250, a determination is reached as to whether a minislot boundary has been reached. If so, the minislot counter M is incremented by one in step 255. In step 260, a determination is made as to whether a frame boundary is reached. If so, then in step 265, the frame counter F is incremented by one. Note that in an embodiment of the invention, the number of minislots per frame can range from two to 64.

The process then returns to step 240. Once the timestamp counter T in the terminal device is equal to the timestamp $T_h$ of the headend, the process concludes at step 270.

In an embodiment of the invention, each synchronous increment of the counters occurs at a leading clock edge. Moreover, the invention may be implemented in hardware, firmware, or software, or any combination thereof.

The following is an example of the invention's operation. Assume that there are ten timestamps per minislot and ten minislots per frame, as in the case of Tables 1 and 2 above. Assume further that the cable modem's frame, minislot, and timestamp counters have initial values of 11, 30, and 200, respectively, and the target values are 15, 75, and 652, respectively. Then the process of the invention would increment the frame counter, while synchronously incrementing the minislot and timestamp counter:

TABLE 3

|  | Frame | | | | |
| --- | --- | --- | --- | --- | --- |
|  | 11 | 12 | 13 | 14 | 15 |
| Minislot | 30 | 40 | 50 | 60 | 70 |
| Timestamp | 200 | 300 | 400 | 500 | 600 |

The frame counter is first incremented from 11 to 12. Because there are ten minislots per frame, the minislot counter is incremented by ten, from 30 to 40. Because there are 100 timestamps per frame, the timestamp counter is incremented from 200 to 300. All this transpires at a single leading clock edge in an embodiment of the invention. Likewise on the next leading clock edge, the frame, minislot, and timestamp counters increment to 13, 50, and 400 respectively. This continues until the counters are within one frame (i.e., 100 timestamps) of the target value. Since the target timestamp value is 652, the frame counter stops synchronously incrementing when the timestamp counter has reached 600.

The frame counter is then held constant. On successive leading clock edges, the minislot counter is repeatedly incremented by one while the timestamp counter is incremented by ten, since there are ten timestamps per minislot:

TABLE 4

|  | Frame | | | | | |
| --- | --- | --- | --- | --- | --- | --- |
|  | 15 | 15 | 15 | 15 | 15 | 15 |
| Minislot | 70 | 71 | 72 | 73 | 74 | 75 |
| Timestamp | 600 | 610 | 620 | 630 | 640 | 650 |

When the counters are within a minislot (i.e., ten timestamps) of the target value, this step concludes. Here, the final timestamp is 650, which is within ten timestamps of the target timestamp counter value of 652. At this point, the timestamp counter is simply incremented until 652 is reached.

Note that in the above example, a frame corresponded to ten minislots, and a minislot corresponded to ten timestamps. These values were chosen for ease of illustration. In embodiments of the invention, the number of minislots per frame can range from 2 to 64. The number of timestamps per frame can range from $2^8$ to $2^{18}$.

Note that while the invention is described above in terms of a DOCSIS-based cable system, the invention can be embodied in communications systems that use other protocols and transmission media. Generally, the invention can be embodied in a communications system featuring an administrative device connected to one or more terminal devices, where the devices need to achieve common counter values. Given that the administrative device maintains a sense of time using a set of hierarchical counters and communicates a point in the upstream by sending a snapshot of its counter values, a terminal device can utilize the processing of this invention to quickly advance its counters to match those of the administrative device.

The administrative device can maintain first, second, and third counters, for example. The counters serve to count first, second, and third units of bandwidth. An integer number of third units correspond to a second unit, and an integer number of second units constitute a first unit. The terminal device maintains an analogous set of counters.

After the administrative device sends a snapshot of its counters to the terminal device, the terminal device starts with the snapshot and advances its counters to catch up to a target, i.e., the counter values of the administrative terminal. The first counter is incremented by one. The second counter is incremented by an amount equal to the number of second units in a first unit, and the third counter is incremented by an amount equal to the number of third units in a first unit. This process repeats until the counters at the terminal unit, i.e., the terminal device's snapshot, are within a first unit of the target.

The second counter is then incremented by one. The third counter is incremented by an amount equal to the number of third units in a second unit. If a first unit boundary is reached, the first counter is incremented by one. This process repeats until the terminal device's snapshot is within a second unit of the target.

The third counter is incremented by one. If a second unit boundary is reached, the second counter is incremented by one. If a first unit boundary is reached, the first counter is incremented by one. The process repeats until the terminal device's snapshot matches the target.

III. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above-described exemplary embodiments.

What is claimed is:

1. A method of synchronizing values within a set of counters in a wireless terminal device to target values in an administrative device for each of the counters, wherein the set of counters comprises a first, a second, and a third counter that count first, second, and third units of bandwidth, respectively, such that the first unit contains X number of second units, and the second unit contains Y number of third units, wherein X and Y are integers, the method comprising:

A. synchronously incrementing all counters within the wireless terminal device until the third counter is within X times Y of the target value for the third counter;

B. synchronously incrementing the second and third counters within the wireless terminal device until the third counter is within Y of the target value for the third counter; and C. incrementing the third counter within the wireless terminal device until the third counter is equal to the target value for the third counter.

2. The method of claim 1, wherein said step A further comprises:

unless the third counter of the wireless terminal device is within X times Y of the target value for the third counter,
(i) incrementing the first counter by one;
(ii) incrementing the second counter by X; and
(iii) incrementing the third counter by X times Y.

3. The method of claim 1, wherein said step B further comprises:

unless the third counter of the wireless terminal device is within Y of the target value for the third counter,
(i) incrementing the second counter by one;
(ii) incrementing the third counter by Y; and
(iii) if a first boundary is reached by the second counter incrementing the first counter by one, wherein the first boundary is the point at which incrementing the second counter triggers the first counter to increment by one during general operation.

4. The method of claim 1, wherein said step C further comprises:
(i) incrementing the third counter by one;
(ii) if a second boundary is reached by the third counter, incrementing the second counter by one; and
(iii) if a first boundary is reached by the second counter incrementing the first counter by one.

* * * * *